United States Patent
Marwah et al.

(10) Patent No.: US 11,244,043 B2
(45) Date of Patent: Feb. 8, 2022

(54) AGGREGATING ANOMALY SCORES FROM ANOMALY DETECTORS

(71) Applicant: ENTIT SOFTWARE LLC, Sanford, NC (US)

(72) Inventors: Manish Marwah, Palo Alto, CA (US); Andrey Simanovsky, Sunnyvale, CA (US)

(73) Assignee: Micro Focus LLC, Santa Clara, CA (US)

( * ) Notice: Subject to any disclaimer, the term of this patent is extended or adjusted under 35 U.S.C. 154(b) by 246 days.

(21) Appl. No.: 16/426,862

(22) Filed: May 30, 2019

(65) Prior Publication Data

US 2020/0380117 A1    Dec. 3, 2020

(51) Int. Cl.
*G06F 21/55*    (2013.01)
*H04L 29/06*    (2006.01)
*G06N 5/04*    (2006.01)
*G06N 20/00*    (2019.01)

(52) U.S. Cl.
CPC ........ *G06F 21/552* (2013.01); *H04L 63/1425* (2013.01); *G06F 21/554* (2013.01); *G06F 2221/033* (2013.01); *G06F 2221/034* (2013.01); *G06N 5/04* (2013.01); *G06N 20/00* (2019.01); *H04L 63/1441* (2013.01)

(58) Field of Classification Search
CPC ................. G06F 21/552; G06F 21/554; G06F 2221/034; G06F 2221/033; H04L 63/1425; H04L 63/1441; G06N 5/04; G06N 20/00
See application file for complete search history.

(56) References Cited

U.S. PATENT DOCUMENTS

| | | | |
|---|---|---|---|
| 9,324,119 B2 | 4/2016 | Singh et al. | |
| 9,336,484 B1* | 5/2016 | Iverson | G06F 16/2465 |
| 9,349,103 B2 | 5/2016 | Eberhardt et al. | |
| 10,043,006 B2 | 8/2018 | Puri et al. | |
| 2007/0294187 A1* | 12/2007 | Scherrer | G06Q 20/401 |
| | | | 705/75 |
| 2008/0104006 A1* | 5/2008 | Kiefer | G06N 5/02 |
| | | | 706/48 |
| 2010/0268557 A1* | 10/2010 | Faith | G06Q 20/3223 |
| | | | 705/7.29 |
| 2016/0217022 A1 | 7/2016 | Velipasaoglu et al. | |
| 2016/0328654 A1 | 11/2016 | Bauer et al. | |
| 2016/0352764 A1* | 12/2016 | Mermoud | H04L 63/1425 |
| 2018/0027006 A1* | 1/2018 | Zimmermann | H04L 63/0245 |
| | | | 726/11 |
| 2018/0083988 A1 | 3/2018 | Kataoka et al. | |

(Continued)

OTHER PUBLICATIONS

Entit Software LLC., U.S. Appl. No. 15/959,461 entitled Unauthorized Authentication Event Detection filed Apr. 23, 2018 (30 pages).

(Continued)

*Primary Examiner* — Meng Li (57) ABSTRACT

In some examples, a system determines a dependency among a plurality of anomaly detectors, the determining comprising clustering anomaly detectors of the plurality of anomaly detectors into clusters of anomaly detectors. The system aggregates anomaly scores produced by anomaly detectors in a first cluster of anomaly detectors, to generate a first aggregate anomaly score, and detects an anomaly using the first aggregate anomaly score.

14 Claims, 3 Drawing Sheets

(56) References Cited

U.S. PATENT DOCUMENTS

| | | | |
|---|---|---|---|
| 2018/0219888 A1 | 8/2018 | Apostolopoulos | |
| 2018/0241761 A1 | 8/2018 | Bania et al. | |
| 2018/0241762 A1 | 8/2018 | Savalle et al. | |
| 2018/0302423 A1 | 10/2018 | Muddu et al. | |
| 2018/0324199 A1 | 11/2018 | Crotinger | |
| 2018/0336353 A1 | 11/2018 | Manadhata et al. | |
| 2019/0065738 A1 | 2/2019 | Kim et al. | |
| 2019/0188212 A1* | 6/2019 | Miller | G06N 7/005 |
| 2020/0073740 A1* | 3/2020 | Ohana | G06F 11/079 |
| 2020/0351298 A1* | 11/2020 | Paturi | G06N 5/04 |

OTHER PUBLICATIONS

Etoty, Renee E et al., A Survey of Visualization Tools Assessed for Anomaly-Based Intrusion Detection Analysis, Army Research Lab Adelphi MD Computational and Information Sciences Directorate. ADA601590, Apr. 2014 (50 pages).

Gamachchi, Anagi et al., A Graph Based Framework for Malicious Insider Threat Detection, 2017 (10 pages).

Gates, Christopher S. et al., IEEE, Generating Summary Risk Scores for Mobile Applications, 2014 (14 pages).

Goldstein et al., PLOS One, A Comparative Evaluation of Unsupervised Anomaly Detection Algorithms for Multivariate Data, Apr. 19, 2018 (17 pages).

Hoeting, Jennifer A. et al. "Bayesian model averaging: a tutorial." Statistical science (1999): 382-401.

Jiang, Heju et al., Instart Logic, Inc., A Recommender System for Efficient Discovery of New Anomalies in Large-Scale Access Logs, Oct. 25, 2016 (9 pages).

Marwah, et al., U.S. Appl. No. 16/426,850 entitled Mapping Between Raw Anomaly Scores and Transformed Anomaly Scores filed May 30, 2019 (33 pages).

Mindtools, Risk Impact/Probability Chart, 2018 (4 pages).

Peng H. et al., Using probabilistic generative models for ranking risks of android apps, in CCS, 2012 (12 pages).

Rayana, Shebuti et al., Less is More: Building Selective Anomaly Ensembles, ACM Transactions on Knowledge Discovery from Data, vol. X, No. X, Article X, Publication date: Apr. 2016 (33 pages).

Simanovsky, et al., U.S. Appl. No. 16/426,856 entitled Visualizations Representing Points Corresponding to Events filed May 30, 2019 (33 pages).

Syarif, Iwan et al., Unsupervised Clustering Approach for Network Anomaly Detection, Conference Paper—Apr. 2012 (12 pages).

Wikipedia, Variation of information last edited Oct. 10, 2018 (2 pages).

* cited by examiner

AGGREGATING ANOMALY SCORES FROM ANOMALY DETECTORS

BACKGROUND

A computing environment can include a network of computers and other types of devices. Issues can arise in the computing environment due to behaviors of various entities. Monitoring can be performed to detect such issues, and to take remedial actions to address the issues.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Certain events (or collections of events) due to behaviors of entities in a computing environment can be considered anomalous. Examples of entities can include users, machines (physical machines or virtual machines), programs, sites, network addresses, network ports, domain names, organizations, geographical jurisdictions (e.g., countries, states, cities, etc.), or any other identifiable element that can exhibit a behavior including actions in the computing environment. A behavior of an entity can cause an anomalous event if the behavior deviates from an expected rule, criterion, threshold, policy, past behavior of the entity, behavior of other entities, or any other target, which can be predefined or dynamically set.

An example of an anomalous behavior of a user involves the user making greater than a number of login attempts into a computer within a specified time interval, or a number of failed login attempts by the user within a specified time interval. An example of an anomalous behavior of a machine or program (e.g., an application program, an operating system, a firmware, a malware, etc.) involves the machine or program receiving or sending greater than a threshold number of data packets (such as due to a port scan or a denial-of-service attack) within a specified time interval, or a number of login attempts by users on the machine that exceed a threshold within a specified time interval. Another example of an anomalous behavior includes exfiltration, which involves the unauthorized transfer or copying of data from a network or machine to a destination outside the network or machine.

To identify issues due to anomalous behavior in a computing environment (e.g., a network, a machine, a collection of machines, a program, a collection of programs, etc.), information of activities (in the form of data packets, requests and responses, etc.) can be analyzed. Issues due to anomalous behaviors can be referred to as "anomalies," which can include any or some combination of: a security attack of a system, a threat that can cause an error, reduced performance of a machine or program (or a collection of machines or programs), stolen or other unauthorized access of information, and so forth.

An activity or a collection of activities can be referred to as an "event." Some events may correspond to an anomaly, while other events may not be considered anomalous. For each event, a number of features can be collected, where a "number of features" can refer to one feature or to multiple features. A "feature" can refer to any attribute that is representative of an aspect associated with an event. Examples of features can include any or some combination of: a user name, a program name, a network address, a metric relating to a usage or performance of a machine or program, a metric relating to an action of an entity (such as a user, machine, or program), and so forth.

Anomaly detectors can be used to produce anomaly scores for respective events or entities (or more specifically, for respective collections of a number of features). An "anomaly score" refers to a value that indicates a degree of anomalousness of an event or entity. For example, the anomaly score can include a probability that a given event or entity is anomalous.

In some examples, different anomaly detectors can use different sets of features and/or different machine learning models that can be trained to generate anomaly scores based on collections of features corresponding to events. A machine learning model can refer to a model that can be modified (trained) based on training data that includes training sets of features. As a machine learning model is continually modified due to training, predictions made by the machine learning models become increasingly more accurate. A prediction of a machine learning model can include an output produced by the machine learning model, based on a set of features, where the output indicates a measure of an anomalousness of an event or entity.

While some anomaly detectors may differ based on the machine learning models used by the anomaly detectors, other anomaly detectors may differ based on use of different sets of features. For example, a first anomaly detector differs from a second anomaly detector if the first anomaly detector uses a first set of features while the second anomaly detector uses a second set of features different from the first set of features.

A computing environment may employ a large number of anomaly detectors (e.g., tens or hundreds of different types of anomaly detectors). Each different anomaly detector generates a corresponding anomaly score. If there are a large number of anomaly detectors, then there will be a corresponding large number of anomaly scores, which can be difficult to decipher for purposes of determining whether or not an anomaly is present in the computing environment.

A naïve aggregation (e.g., computing the mean, median, mode, etc.) of the anomaly scores from the large number of anomaly detectors can produce inaccurate results, such as false positives or false negatives. A false positive refers to erroneously indicating that an anomaly is present when in fact the anomaly did not occur. A false negative refers to erroneously indicating lack of an anomaly when an anomaly actually occurred. A false negative can lead to overlooking an anomaly, which may adversely impact operation of the computing environment.

In accordance with some implementations of the present disclosure, techniques or mechanisms are provided to determine which anomaly detectors are approximately dependent upon one another, and which anomaly detectors are approximately independent of one another. The aggregation of anomaly scores is based on the determined dependency among the anomaly detectors. In some implementations, the determination of dependencies among the anomaly detectors includes clustering the anomaly detectors based on values of a distance metric computed among the anomaly detectors.

Anomaly detectors are considered to be approximately dependent or approximately independent of one another because such anomaly detectors may not be totally dependent or totally independent. Anomaly detectors that are approximately dependent on one another are also considered to be weakly independent of one another. Anomaly detectors that are approximately independent of one another are also considered to be weakly dependent of one another.

Figure 1:
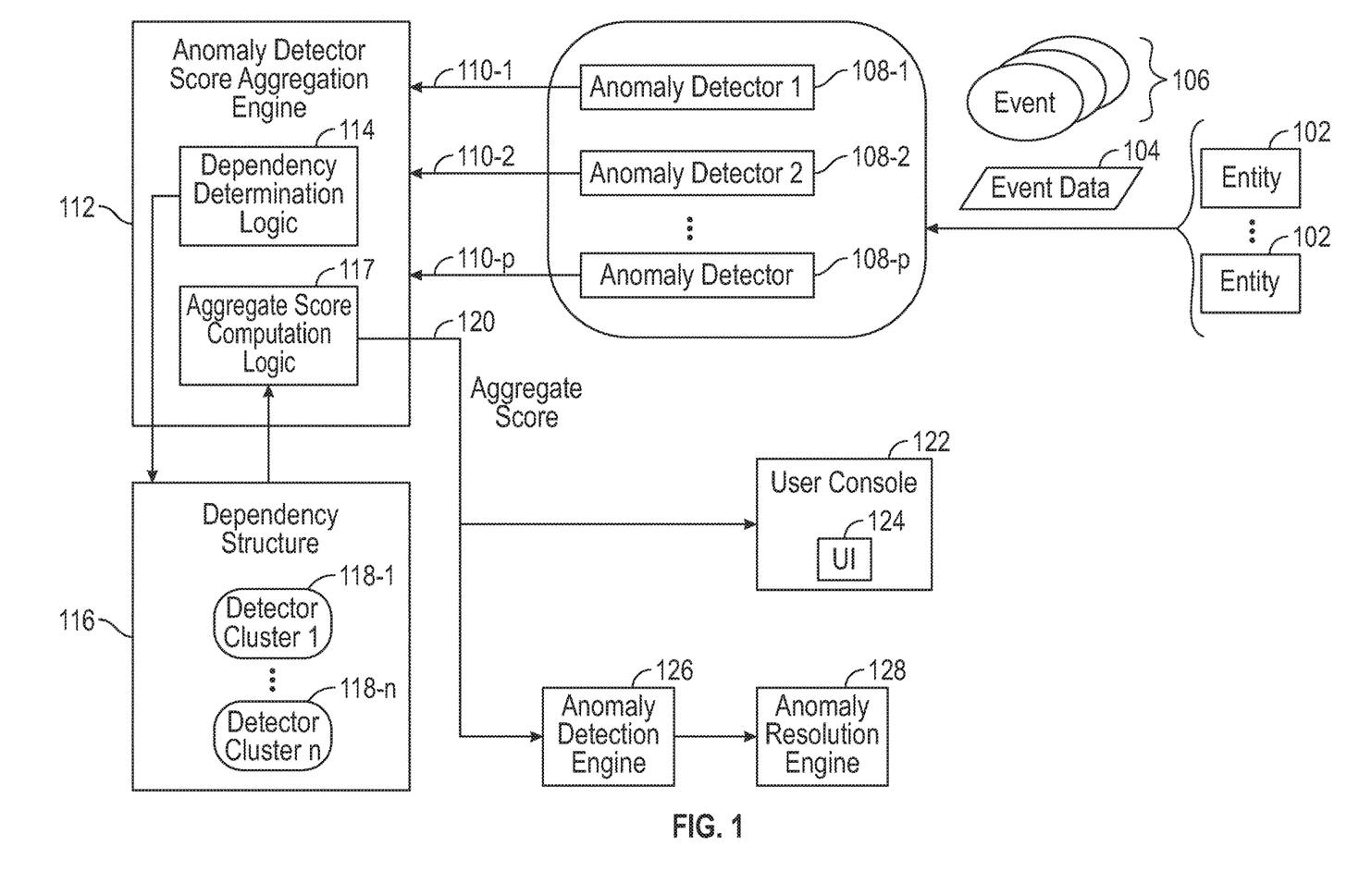
FIG. 1 is a block diagram of an arrangement including an anomaly detector score aggregation engine according to some examples.

FIG. 1 is a block diagram of an example computing environment that includes a number of entities 102, including users, machines, and/or programs (a program includes machine-readable instructions). Activities of the entities 102 produce raw event data 104 that represent events 106 that have occurred in the computing environment.

Examples of events can include any or some combination of the following: login events (e.g., events relating to a number of login attempts and/or devices logged into); events relating to access of resources such as websites, files, machines, programs, etc.; events relating to submission of queries such as Domain Name System (DNS) queries; events relating to sizes and/or locations of data (e.g., files) accessed; events relating to loading of programs; events relating to execution of programs; events relating to accesses made of components of the computing environment; errors reported by machines or programs; events relating to performance monitoring or measurement of various characteristics of the computing environment (including monitoring of network communication speeds, execution speeds of programs, etc.), and/or other events.

Data relating to events can be collected as event data records (also referred to as "data points" or simply "points"), which are part of the event data 104. An event data record (or "point") can include a number of features, such as a time feature (to indicate when the event occurred or when the event data record was created or modified). Further features of an event data record can depend on the type of event that the event data record represents. For example, if an event data record is to represent a login event, then the event data record can include a time feature to indicate when the login occurred, a user identification feature to identify the user making the login attempt, a resource identification feature to identify a resource in which the login attempt was made, and so forth. For other types of events, an event data record can include other features.

The event data 104 can include any or some combination of the following types of data: network event data, host event data, application data, and so forth. Network event data is collected on a network device such as a router, a switch, or other network device that is used to transfer or otherwise communicate data between other devices. Examples of network event data include Hypertext Transfer Protocol (HTTP) data, DNS data, Netflow data (which is data collected according to the Netflow protocol), and so forth.

Host event data can include data collected on computers (e.g., desktop computers, notebook computers, tablet computers, server computers, etc.), smartphones, Internet-of-Things (IoT) devices, or other types of electronic devices. Host event data can include information of processes, files, operating systems, and so forth, collected in computers.

Application data can include data produced by application programs, such as logs of the activities of a Web server or DNS server or other application programs such as database programs, spreadsheet programs, word processing programs, program development and monitoring tools, and so forth.

The computing environment also includes multiple anomaly detectors 108-1 to 108-$p$, where m≥2. An anomaly detector 108-$i$ (i=1 to p) is able to produce a respective anomaly score 110-$i$ (110-1 to 110-$p$ shown in FIG. 1) based on a number of features that are part of a point (also referred to as "an event data record" above). An anomaly detector 108-$i$ receives an event data record that is part of the event data 104, and generates a corresponding anomaly score 110-$i$.

As noted above, the different anomaly detectors 108-1 to 108-$p$ can use different sets of features and/or different machine learning models that can be trained to generate anomaly scores based on collections of features corresponding to events.

Machine learning based anomaly detectors can broadly be classified as supervised, unsupervised, or semi-supervised. A supervised machine learning model uses labeled data for training. Examples of supervised machine learning models include any or some combination of the following: a tree-based model such as a decision tree, a random forest, a gradient boosted machine, etc.; a neural network based model; a graphical based model such as a Bayesian network, a Markov random field, etc.; a support vector machine based model, and so forth.

An unsupervised machine learning model uses unlabeled data for training. Examples include any or some combination of the following: a clustering based model; a density estimation based model, a neural network based model; and so forth.

A semi-supervised machine learning model uses some amount of labeled data and some amount of unlabeled data for training. Examples include any or some combination of the following: a graphical based model such as a Bayesian network, a Markov random field, and so forth.

The anomaly scores 110-1 to 110-$p$ produced by the respective anomaly detectors 108-1 to 108-$p$ based on the event data 104 can be provided to an anomaly detector score aggregation engine 112, which is able to aggregate the anomaly scores 110-1 to 110-$p$ using techniques according to some implementations of the present disclosure.

As used here, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

Anomaly scores are aggregated differently based on whether the anomaly scores are from anomaly detectors that are dependent or independent. As used here, "dependent" anomaly detectors can refer to anomaly detectors that are approximately dependent, and "independent" anomaly detectors can refer to anomaly detectors that are approximately independent.

The anomaly detector score aggregation engine 112 includes a dependency determination logic 114 that is able to discover a dependency structure 116 among the anomaly detectors 108-1 to 108-$p$. An aggregate score computation logic 117 of the anomaly detector score aggregation engine 112 can use the dependency structure 116 to aggregate the anomaly scores 110-1 to 110-$p$, to produce an aggregate score 120.

Each of the dependency determination logic 114 and the aggregate score computation logic 117 can be implemented as a portion of the hardware processing circuit of the anomaly detector score aggregation engine 112, or alternatively, as machine-readable instructions executable by the hardware processing circuit of the anomaly detector score aggregation engine 112.

Although the dependency determination logic 114 and the aggregate score computation logic 117 are shown as being part of the anomaly detector score aggregation engine 112, it is noted that in other examples, the dependency determination logic 114 and/or the aggregate score computation logic 117 can be separate from the anomaly detector score aggregation engine 112.

The dependency structure 116 produced by the dependency determination logic 114 identifies clusters of anomaly detectors. In the example of FIG. 1, the dependency structure 116 identifies n (n≥2) detector clusters 118-1 to 118-$n$, where each detector cluster 118-$j$ (j=1 to n) includes a number (1 or greater than 1) of anomaly detectors. Anomaly detectors within a detector cluster 118-$j$ are considered to be approximately dependent on one another.

On the other hand, anomaly detector(s) in a first detector cluster and anomaly detector(s) in a second detector cluster are considered to be approximately independent of one another.

In accordance with some examples, the anomaly detector score aggregation engine 112 can aggregate the anomaly scores 110-1 to 110-$p$ in multiple phases. First, the anomaly scores of anomaly detectors that are likely to produce dependent scores (i.e., anomaly detectors within a respective detector cluster 118-$i$) are first aggregated to produce a cluster score for the detector cluster 118-$j$. Thus, for example, the anomaly scores produced by the anomaly detectors in the first detector cluster 118-1 are aggregated to generate a cluster score 1, and the anomaly scores produced by the anomaly detectors in the n$^{th}$ detector cluster 118-$n$ are aggregated to generate a cluster score n. The cluster scores of different detector clusters are considered to be approximately independent of one another.

In some examples, the aggregating of anomaly scores by approximately dependent anomaly detectors (within a given detector cluster 118-$j$) is performed in a way that even a single high anomaly score pushes the aggregate score high.

The approximately independent cluster scores are aggregated by multiplying the cluster scores, in some examples, which produces the aggregate score 120.

In some examples, the aggregate score 120 can be sent to a user console 122, which can include a user device such as a desktop computer, a notebook computer, a tablet computer, a smartphone, and so forth. The user console 122 can display a user interface (UI) 124, in which the aggregate anomaly score 120 (or a report or summary based on the aggregate anomaly score 120) can be displayed. The report or summary displayed in the UI 124 can be in text form, graphical form, or in any other form. An analyst using the user console 122 can review the information displayed in the UI 124 to determine whether or not anomalies are present in the computing environment.

In other examples, the anomaly detector score aggregation engine 112 can output the aggregate anomaly score 120 to an anomaly detection engine 126. The anomaly detection engine 126 can use the aggregate anomaly score 120 to detect whether anomalies are present in the event data 104. For example, the anomaly detection engine 126 can compare the aggregate anomaly score 120 to a threshold, and if the aggregate anomaly score 120 exceeds or has another relationship relative to the threshold, the anomaly detection engine 126 can indicate that an anomaly has been detected.

If anomalies are detected, then the anomaly detection engine 126 can provide information identifying the detected anomalies to an anomaly resolution engine 128. The anomaly resolution engine 128 can respond to information identifying a detected anomaly by performing a countermeasure to address the anomaly. A "countermeasure" can refer to a remedial action, or a collection of remedial actions, that can be performed to address an anomaly. Examples of countermeasures that can be performed include any of the following: causing a firewall to allow certain communications while blocking other communications, causing an intrusion detection system to detect unauthorized intrusion of a system and to disable access in response to the intrusion detection, causing a disabling system to shut down a device, cause a system to prevent communication by a device within a network, cause a device to shut down or stop or pause a program in the device, cause an anti-malware tool to scan a device or a network for identifying malware and to either remove or quarantine the malware, and so forth.

Discovering a Dependency Structure

The following describes examples relating to discovering the dependency structure 116, such as by the dependency determination logic 114.

Given a number of anomaly detectors, in order to aggregate their anomaly scores, the dependency determination logic 114 determines which anomaly detectors form dependent groups (i.e., the detector clusters 118-1 to 118-$n$ of FIG. 1). In some examples, a heuristic used by the dependency determination logic 114 is to consider anomaly detectors as dependent if the anomaly detectors use about the same input features, or features that are highly dependent; otherwise, the anomaly detectors are considered independent.

In further examples, the dependency determination logic 114 can empirically determine if anomaly detectors are approximately dependent or independent. The empirical technique used by the dependency determination logic 114 can compute entropy of a first anomaly detector conditioned on a second anomaly detector. More specifically, for anomaly detectors $D_i$ and $D_j$, the dependency determination logic 114 computes the entropy $H(D_j|D_i)$. If anomaly detectors $D_i$ and $D_j$ are approximately dependent (or weakly independent), $H(D_i|D_j) \approx 0$ (or equivalently, $H(D_j|D_i) \approx 0$), that is, the conditional entropy is close to zero. It may be possible that $H(D_i|D_j) = 0$ while $H(D_j|D_i) \neq 0$; as a result, aggregation of conditional entropies may be employed (discussed further below) for improved performance.

On the other hand, if anomaly detectors $D_i$ and $D_j$ are approximately independent (or weakly dependent), $H(D_i|D_j)$ ≈H($D_i$) (or equivalently, H($D_j$|$D_i$)≈H($D_j$)), that is, knowledge of one anomaly detector does not impact the entropy of the other anomaly detector.

Figure 2:
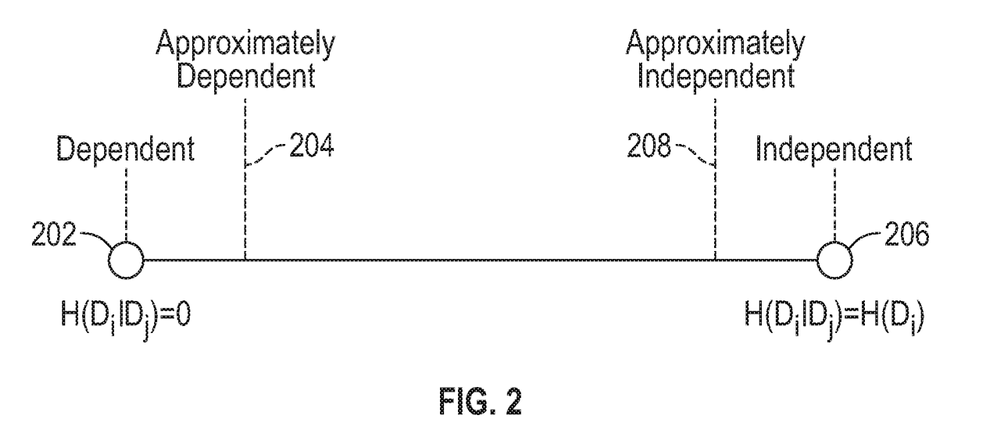
FIG. 2 illustrates entropy values and indicated dependencies between anomaly detectors, according to some examples.

FIG. 2 shows an example of entropy measures that indicate dependent and independent anomaly detectors. H($D_i$|$D_j$)=0 indicates (202) totally dependent anomaly detectors $D_i$ and $D_j$. H($D_i$|$D_j$)≈0 (i.e., H($D_i$|$D_j$) close to zero) indicates (204) approximately dependent anomaly detectors $D_i$ and $D_j$.

H($D_i$|$D_j$)=H($D_i$) indicates (206) totally independent anomaly detectors $D_i$ and $D_j$. H($D_i$|$D_j$)≈H($D_i$) (i.e., H($D_i$|$D_j$) is close to the value of H($D_i$)) indicates (208) approximately independent anomaly detectors $D_i$ and $D_j$.

Conditional entropy can be used as a distance metric to cluster the detectors. Note that conditional entropy is not symmetric, and therefore not a real metric; to make conditional entropy symmetric, the dependency determination logic 114 can use the sum (or other mathematical aggregate) of the conditional entropies, H($D_i$|$D_j$)+H($D_j$|$D_i$), as the distance metric. This distance metric can be referred to as variation of information or shared information distance. The distance metrics computed for different pairs of anomaly detectors can be used to cluster the anomaly detectors using hierarchical clustering. With using hierarchical clustering, a number of detector clusters does not have to be first pre-specified—the number of detector clusters an be later selected after visually inspecting the dendrogram (a tree diagram that shows relationships among the anomaly detectors based on the distance metrics).

In other examples, alternative or additional clustering techniques can be used, such as any or some combination of K-means clustering, K-medoids clustering, spectral clustering, and so forth.

Aggregating Approximately Dependent Anomaly Detectors

The aggregate score computation logic 117 can aggregate approximately dependent anomaly detectors within a detector cluster 118-$j$.

In some examples, an objective of aggregating the anomaly scores of approximately dependent anomaly detectors within the detector cluster 118-$j$ is that a high anomaly score from an anomaly detector in the detector cluster 118-$j$ should result in a high aggregate score (the cluster score produced for the detector cluster 118-$j$).

It is assumed there are m (m>1) anomaly detectors in the detector cluster 118-$j$. Them anomaly detectors output anomaly scores $S_1, S_2, \ldots, S_m \in [0, 100]$ (or equivalently, [0, 1]). In other examples, an anomaly score can be bounded in a range between a different lower bound and/or a different upper bound.

Each of the m anomaly detectors is assigned a respective optional weight: $w_1, w_2, \ldots, w_m$. If no weights are specified: $w_1, w_2, \ldots, w_m \in \{1\}$.

In some examples, reverse anomaly scores are computed by the aggregate score computation logic 117 based on the anomaly scores $S_1, S_2, \ldots, S_m$ output by the m anomaly detectors within the detector cluster 118-$j$. The reverse anomaly scores for the detector cluster 118-$j$ are computed as follows:

$$S_1^r = 100 - S_1, S_2^r = 100 - S_2, \ldots, S_m^r = 100 - S_m.$$

For the detector cluster 118-$j$, the aggregate score computation logic 117 computes an aggregate reverse score $S_{agg}^r$ by computing the harmonic mean of the reverse scores ($S_1^r, S_2^r, \ldots, S_m^r$)

$$S_{agg}^r = \frac{\sum_{i=0}^{m} w_i}{\sum_{i=0}^{m} \frac{w_i}{S_i^r}}.$$

The cluster score $S_{agg}$ for the detector cluster 118-$j$ is computed by the aggregate score computation logic 117 as:

$$S_{agg}^j = 100 - S_{agg}^r.$$

Cluster scores for each of the detector clusters 118-1 to 118-$n$ are computed in similar fashion as for $S_{agg}^j$.

Although the foregoing provides an example of aggregating anomaly scores of multiple anomaly detectors within the detector cluster 118-$j$, in some cases, the detector cluster 118-$j$ may include just one anomaly detector, in which case the cluster score would be set equal to the anomaly score of the single anomaly detector in the detector cluster 118-$j$.

As discussed in the next section, the cluster scores $S_{agg}^j$ of the multiple detector clusters 118-1 to 118-$n$ are aggregated to obtain an aggregate score (e.g., 120 in FIG. 1).

Aggregating Cluster Scores of Detector Clusters

In some examples, it is assumed that cluster scores $S_{agg}^j$ produced by aggregating anomaly scores of approximately dependent anomaly detectors within a detector cluster 118-$j$ are either probabilities or negative log probabilities.

A simple way to combine independent probabilities is to multiply them (or add them in log space) as discussed below.

In other examples, other types of cluster scores $S_{agg}^j$ can be used, and other techniques of combining the cluster scores $S_{agg}^j$ can be used.

Assume there are n cluster scores, $S_{agg}^j$, and optional cluster weights, $cw_j$ (these cluster weights can be computed from weights $w_i$ of the anomaly detectors in the detector clusters as discussed above) assigned to respective detector clusters. If no cluster weights are given, the cluster weights can be set to 1.

Since cluster scores are assumed to be negative log probabilities, the aggregate score computation logic 117 can take their weighted arithmetic mean, which is equivalent to taking the geometric mean of the probabilities, to compute the aggregate score 120 represented as $S'_{agg}$ in the equation below.

$$S'_{agg} = \frac{\sum_{j=0}^{n} cw_j S_{agg}^j}{\sum_{j=0}^{n} cw_j}.$$

The aggregate score $S'_{agg}$ is computed based on the cluster scores $S_{agg}^j$ and the cluster weights $cw_j$ assigned to the detector clusters (or equivalently, the cluster scores $S_{agg}^j$).

If historical data is available for the anomaly detectors, such that priors and likelihoods can be computed for the anomaly detectors, the aggregate score computation logic 117 can use a Bayesian approach to aggregate the cluster scores.

Note that conditional independence assumptions are employed in the Bayesian aggregation approach, since as part of discovering the dependency structure, the clusters are already approximately independent. The conditional independence assumptions are already valid to a large extent (and thus would not lead to inaccuracies, which would have resulted had these assumptions not been true).

FURTHER EXAMPLES

Figure 3:
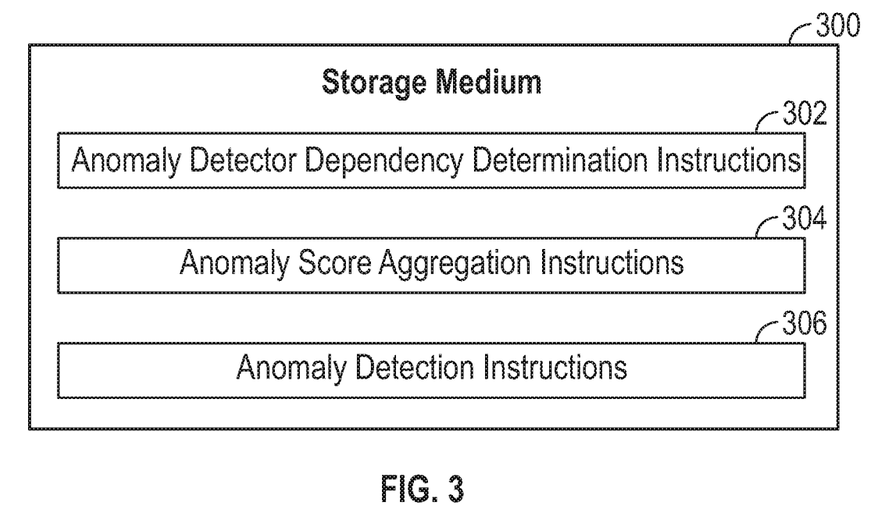
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a system (a computer or multiple computers) to perform various tasks.

The machine-readable instructions include anomaly detector dependency determination instructions 302 to determine a dependency among a plurality of anomaly detectors, the determining comprising clustering anomaly detectors of the plurality of anomaly detectors into clusters (e.g., 118-1 to 118-n in FIG. 1) of anomaly detectors.

The machine-readable instructions further include anomaly score aggregation instructions 304 to aggregate anomaly scores produced by anomaly detectors in a first cluster of anomaly detectors, to generate a first aggregate anomaly score (e.g., a first cluster score).

The machine-readable instructions further include anomaly detection instructions 306 to detect an anomaly using the first aggregate anomaly score.

In further examples, the machine-readable instructions can aggregate anomaly scores produced by anomaly detectors in a second cluster of anomaly detectors, to generate a second aggregate anomaly score (e.g., a second cluster score), where the detecting of the anomaly further uses the second aggregate anomaly score.

In further examples, the machine-readable instructions can aggregate the first and second aggregate anomaly scores to produce an overall aggregate anomaly score (e.g., 120 in FIG. 1), where the detecting of the anomaly uses the overall aggregate anomaly score.

Figure 4:
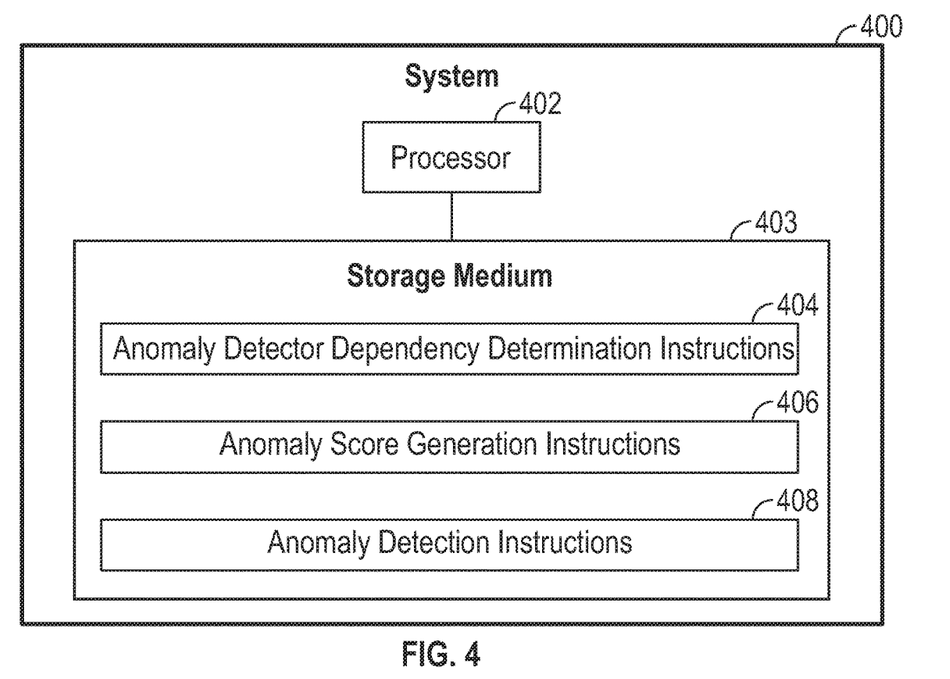
FIG. 4 is a block diagram of a system according to some examples.

FIG. 4 is a block diagram of a system 400 that includes a hardware processor 402 (or multiple hardware processors). A hardware processor can include a microprocessor, a core of a multi-core microprocessor, a microcontroller, a programmable integrated circuit, a programmable gate array, a digital signal processor, or another hardware processing circuit.

The system 400 further includes a storage medium 403 storing machine-readable instructions executable on the hardware processor 402 to perform various tasks. Machine-readable instructions executable on a hardware processor can refer to the instructions executable on a single hardware processor or the instructions executable on multiple hardware processors.

The machine-readable instructions include anomaly detector dependency determination instructions 404 to determine a dependency among a plurality of anomaly detectors, the determining comprising clustering anomaly detectors of the plurality of anomaly detectors into clusters of anomaly detectors.

The machine-readable instructions further include aggregate anomaly score generation instructions 406 to generate an aggregate anomaly score for each respective cluster of anomaly detectors based on aggregating anomaly scores produced by anomaly detectors in the respective cluster of anomaly detectors.

The machine-readable instructions further include anomaly detection instructions 408 to detect an anomaly using the generated aggregate anomaly scores.

Figure 5:
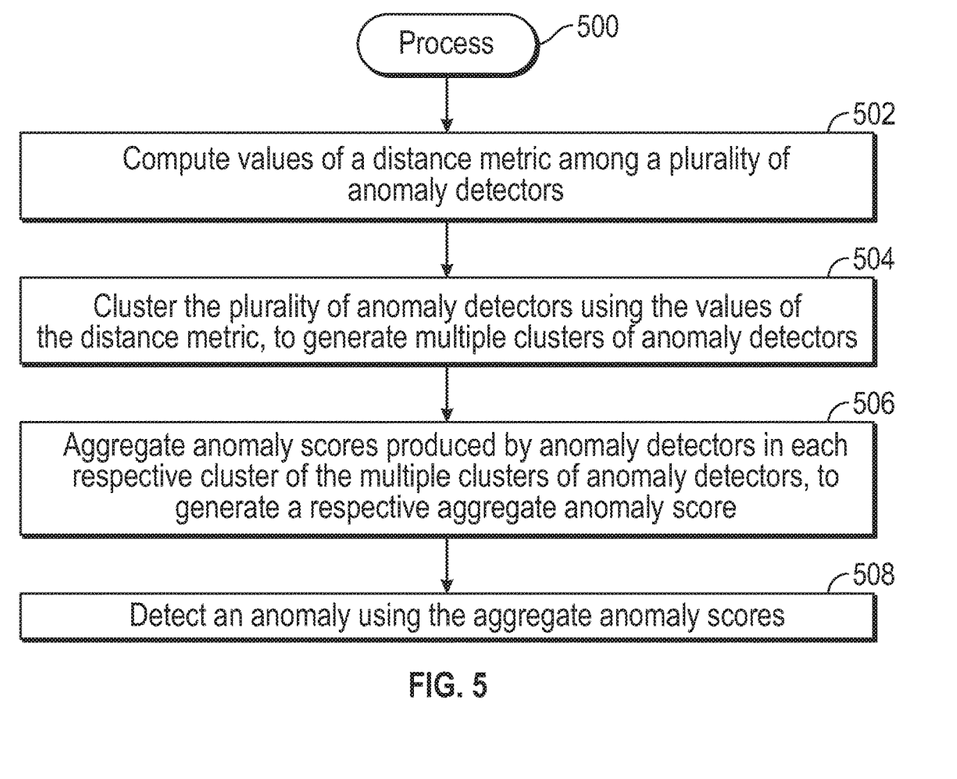
FIG. 5 is a flow diagram of a process according to some examples.

FIG. 5 is a flow diagram of a process 500 according to some examples. The process 500 can be performed by the anomaly detector score aggregation engine 112 of FIG. 1, for example.

The process 500 includes computing (at 502) values of a distance metric among a plurality of anomaly detectors. The process 500 includes clustering (at 504) the plurality of anomaly detectors using the values of the distance metric, to generate multiple clusters of anomaly detectors.

The process 500 includes aggregating (at 506) anomaly scores produced by anomaly detectors in each respective cluster of the multiple clusters of anomaly detectors, to generate a respective aggregate anomaly score.

The process 500 includes detecting (at 508) an anomaly using the aggregate anomaly scores.

A storage medium (e.g., 300 in FIG. 3 or 403 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:

determine a dependency among a plurality of anomaly detectors, the determining comprising clustering anomaly detectors of the plurality of anomaly detectors into clusters of anomaly detectors;

aggregate anomaly scores produced by anomaly detectors in a first cluster of anomaly detectors, to generate a first aggregate anomaly score;

detect an anomaly using the first aggregate anomaly score; and compute values of a distance metric among the plurality of anomaly detectors,
wherein the clustering is based on the values of the distance metric, and
wherein the distance metric is based on a conditional entropy between anomaly detectors of the plurality of anomaly detectors.

2. The non-transitory machine-readable storage medium of claim 1, wherein the instructions that upon execution cause the system to:
aggregate anomaly scores produced by anomaly detectors in a second cluster of anomaly detectors, to generate a second aggregate anomaly score,
wherein the detecting of the anomaly further uses the second aggregate anomaly score.

3. The non-transitory machine-readable storage medium of claim 2, wherein the instructions that upon execution cause the system to:
aggregate the first and second aggregate anomaly scores to produce an overall aggregate anomaly score,
wherein the detecting of the anomaly uses the overall aggregate anomaly score.

4. The non-transitory machine-readable storage medium of claim 3, wherein aggregating the first and second aggregate anomaly scores to produce the overall aggregate anomaly score uses weights assigned to respective aggregate anomaly scores of the first and second aggregate anomaly scores.

5. The non-transitory machine-readable storage medium of claim 1, wherein a value of the distance metric between a first anomaly detector and a second anomaly detector of the plurality of anomaly detectors is based on a first value of a conditional entropy computed for the first anomaly detector given the second anomaly detector, and a second value of a conditional entropy computed for the second anomaly detector given the first anomaly detector.

6. The non-transitory machine-readable storage medium of claim 5, wherein the value of the distance metric between the first anomaly detector and the second anomaly detector is based on an aggregate of the first value and the second value.

7. The non-transitory machine-readable storage medium of claim 1, wherein aggregating the anomaly scores produced by the anomaly detectors in the first cluster of anomaly detectors comprises using weights assigned to respective anomaly detectors in the first cluster of anomaly detectors.

8. The non-transitory machine-readable storage medium of claim 1, wherein aggregating the anomaly scores produced by the anomaly detectors in the first cluster of anomaly detectors comprises:
computing reverse scores based on the anomaly scores produced by the anomaly detectors in the first cluster of anomaly detectors, to produce reverse scores, and
compute a reverse aggregate score based on the reverse scores.

9. The non-transitory machine-readable storage medium of claim 8, wherein aggregating the anomaly scores produced by the anomaly detectors in the first cluster of anomaly detectors comprises reversing the reverse aggregate score to compute the first aggregate anomaly score.

10. A system comprising:
a processor; and
a non-transitory storage medium storing instructions executable on the processor to:
determine a dependency among a plurality of anomaly detectors, the determining comprising clustering anomaly detectors of the plurality of anomaly detectors into clusters of anomaly detectors;
generate an aggregate anomaly score for each respective cluster of anomaly detectors based on aggregating anomaly scores produced by anomaly detectors in the respective cluster of anomaly detectors;
detect an anomaly using the generated aggregate anomaly scores; and
discover a dependency structure among the plurality of anomaly detectors,
wherein the dependency structure is used to generate the aggregate anomaly scores,
wherein the dependency structure identifies the clusters of anomaly detectors,
wherein the dependency structure identifies n (n≥2) of the clusters of anomaly detectors, and
wherein each cluster in the clusters of anomaly detectors includes a number of anomaly detectors, and wherein anomaly detectors within a cluster of the each cluster are classified as approximately dependent on one another.

11. The system of claim 10, wherein the instructions are executable on the processor to:
further aggregate the generated aggregate anomaly scores to produce an overall aggregate anomaly score,
wherein the detecting of the anomaly uses the overall aggregate anomaly score.

12. The system of claim 10, wherein the clusters of anomaly detectors comprise a first cluster and a second cluster, and wherein anomaly detectors in the first cluster are considered to be approximately independent from anomaly detectors in the second cluster.

13. A method of a system comprising a hardware processor, comprising:
computing values of a distance metric among a plurality of anomaly detectors;
clustering the plurality of anomaly detectors using the values of the distance metric, to generate multiple clusters of anomaly detectors;
aggregating anomaly scores produced by anomaly detectors in each respective cluster of the multiple clusters of anomaly detectors, to generate a respective aggregate anomaly score; and
detecting an anomaly using the aggregate anomaly scores;
wherein the clustering is based on the values of the distance metric, and
wherein the distance metric is based on a conditional entropy between anomaly detectors of the plurality of anomaly detectors.

14. The method of claim 13, further comprising:
further aggregating the aggregate anomaly scores for the respective clusters of the multiple clusters of anomaly detectors to generate an overall aggregate anomaly score,
wherein detecting the anomaly uses the overall aggregate anomaly score.

* * * * *